Nov. 15, 1949     J. W. WEXLER     2,487,957

METHOD OF PREPARING FISH

Filed Oct. 3, 1947

CASING

FROZEN GROUND FISH, SEASONING, AND FISH LIQUOR

INVENTOR.
JOHN W. WEXLER
BY Herman L. Gordon
ATTORNEY

Patented Nov. 15, 1949

2,487,957

UNITED STATES PATENT OFFICE 2,487,957

METHOD OF PREPARING FISH

John W. Wexler, Silver Spring, Md.

Application October 3, 1947, Serial No. 777,825

1 Claim. (Cl. 99—195)

This invention relates to food preparation and products, and more particularly to frozen fish products and methods of manufacture thereof.

A main object of the invention is to provide a novel and improved method of preparing fish products wherein very economical utilization of fish is achieved, wherein the resultant product may be maintained in a state of preservation over long periods of time, and wherein the freshness and flavor of the original fish combined with seasoning and other ingredients is preserved without change or deterioration.

A further object of the invention is to provide an improved fish preparation which may be treated in a manner analogous to that in which ground meat is treated, for serving at lunch counters, restaurants, and in the home, said preparation being unique in flavor and having high nutritional value as food.

A still further object of the invention is to provide an improved frozen fish product which is easy to manufacture, convenient to package and serve, and which minimizes waste of food by utilizing all of the edible flesh of the fish, the product being appetizing in appearance and wholesome in quality.

A still further object of the invention is to provide an improved method of utilizing fish whereby wastage and spoilage of fish is minimized, said method thereby making available to the public in an appetizing and convenient form food of high nutritional value which may be served as attractively as meat but which is much less expensive.

Further objects and advantages of the invention will become apparent from the following description and claim, and from the accompanying drawings, wherein:

Figures 1, 2, 3:
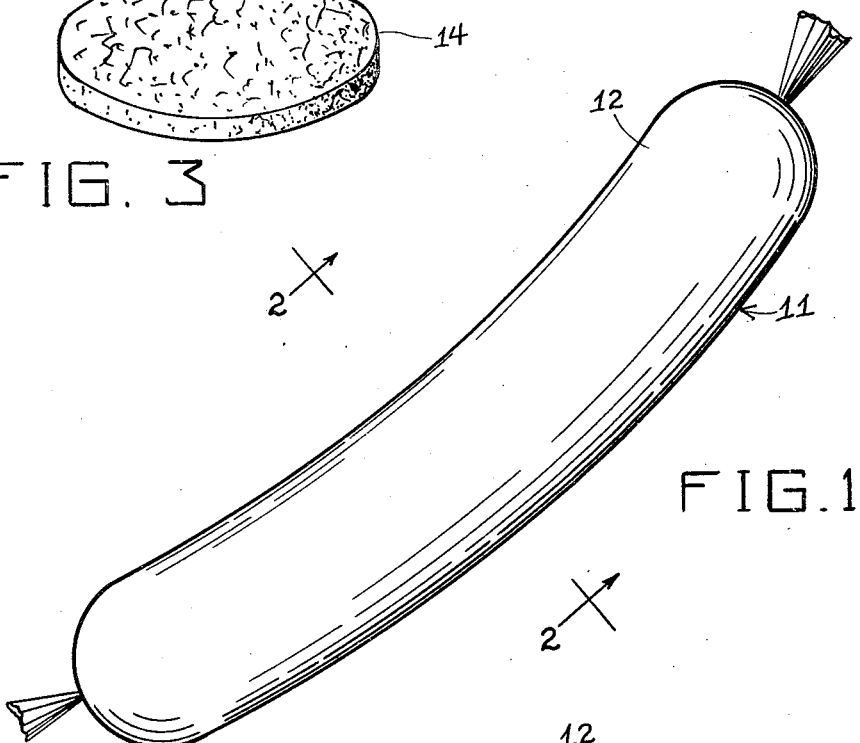
Figure 1 is an elevational view of one form of fish product prepared in accordance with the present invention.
Figure 2 is an enlarged cross-sectional view taken on line 2—2 of Figure 1.
Figure 3 is a perspective view of an alternative form of fish product prepared in accordance with the present invention.

It is well known that many tons of fish are wasted annually due to spoilage and due to the fact that the public demand for fish is ordinarily much less than that for meat. Fish is a highly nutritious and wholesome food, and is much less expensive than meat. However, it is ordinarily not as convenient to prepare and serve, nor as appetizing as meat.

A prime purpose of the present invention is to alleviate the enormous wastage of valuable fish by providing a convenient and efficient method of preparing fish and converting it into attractive and readily marketable forms which may be utilized as readily as meat products.

In accomplishing the aforementioned objects of the present invention, any single species of fish or combination of species may be utilized. In a preferred embodiment of the invention, three common species of fish, such as haddock, rockfish and carp are used in combination. The fish are scaled, cleaned, and the fins thereof are removed. They are then thoroughly washed in salt water, the washing process being preferably repeated several times to remove all loose material from the fish. The fish are then thoroughly dried by any suitable means, as, for example, by a warm air blast.

After the preliminary drying process, the fish are placed in suitable net bags, such as cheesecloth bags, about 25 pounds of fish being contained in each bag. The bags of fish are placed in large kettles of water and thoroughly boiled, the boiling process being continued for approximately 45 minutes.

Following the boiling process, the bags of fish are removed from the kettles and the fish are removed from the bags and placed on wire mesh racks to drain, said racks being placed in a refrigerated compartment which is maintained at a chilling temperature of approximately 50 degrees Fahrenheit. The racks containing the boiled fish are kept in the chilling compartment between 12 and 24 hours, during which time the fish are dried by the drainage therefrom or by the squeezing therefrom of all excess moisture.

The liquor obtained in the boiling process is also kept in the chilling compartment. All subsequent steps in the procedure are carried on in this compartment, except the final freezing step, which will be subsequently described.

At the completion of the above described drying and chilling step, all the meat is removed from the fish carcasses and ground up in conventional meat grinders or the like. The meat may be run through the grinders several times to insure thorough comminution thereof.

At the completion of the grinding step, small amounts of salt, pepper, paprika, onions, garlic, cloves and mustard, in comminuted form, are added to the ground fish and thoroughly mixed therewith. At the same time, the chilled fish liquor obtained in the boiling step is added in gradual increments to the mixture until a thick paste is obtained, the quantity of fish liquor being about 10 percent by weight of the total mixture.

The quantity of fish liquor added at this stage is quite critical and largely governs the success of the subsequent stages of the procedure. It has been found that if less than 8 percent of fish liquor is employed, the mixture is too dry for efficient handling in the subsequent steps of the procedure, and satisfactory freezing of the mixture for preservation of the comminuted fish will not occur. If more than 10 percent of fish liquor is employed, the mixture will be too loose for efficient handling, and the resultant frozen product will contain isolated large granular ice particles, resulting in excessive shrinkage when the product is warmed for serving.

After the proper mixture of ground fish, seasoning, and fish liquor has been obtained, as above described, the mixture may be introduced into conventional sausage casings, whereby a product such as is illustrated in Figures 1 and 2 is obtained. Referring to said figures, the product is designated generally at 11. The casing is shown at 12, and the mixture of ground fish, seasoning and fish liquor is designated at 13. The encased products of Figures 1 and 2 are then frozen to a temperature of about minus 10 degrees Fahrenheit, under which conditions they become entirely rigid. They are then packaged in suitable containers and are subsequently maintained at said low freezing temperature until they are ready for serving. To serve, they are merely warmed in the same manner as meat sausages and may be served on rolls accompanied by a suitable fish sauce.

Instead of introducing the mixture of ground fish, seasoning and fish liquor into casings, it may be introduced into suitable molds or formed into cakes and then frozen to the final low temperature, whereby a frozen cake or patty, such as is shown at 14 in Figure 3, is obtained. The frozen cakes 14 are packaged in suitable containers which are maintained at the low freezing temperature until the cakes are ready for serving. To serve, they are warmed in the same manner as ground meat cakes, and may be served on rolls and may be accompanied by a suitable fish sauce.

The fish liquor remaining may be employed to make fish soups or chowder, so that practically all edible materials of the fish are utilized, and wastage is kept at a minimum. The soup or chowder may be canned to prevent deterioration thereof.

While specific embodiments of a method of fish preparation and specific products obtained therefrom have been disclosed in the foregoing description, it will be understood that various modifications within the spirit of the invention may occur to those skilled in the art. Therefore it is intended that no limitations be placed on the invention except as defined by the scope of the appended claim.

What is claimed is:

A method of processing fish comprising the steps of cleaning the fish, drying the fish, boiling the fish for approximately 45 minutes, again drying the fish, chilling the fish at a temperature of approximately 50 degrees Fahrenheit for a period of between 12 and 24 hours, chilling the fish liquor obtained in the boiling step, removing the flesh from the fish while chilled, comminuting the chilled flesh, adding seasoning, mixing the chilled comminuted flesh and seasoning with the chilled fish liquor obtained in the boiling step in the proportion of between 8 and 10 parts of fish liquor to 100 parts of the total mixture whereby a paste is obtained, said proportion of between 8 and 10 parts being sufficient to prevent the formation of ice crystals in the paste during subsequent freezing, and then freezing said paste to hardness.

JOHN W. WEXLER.

REFERENCES CITED

The following references are of record in the file of this patent:

UNITED STATES PATENTS

| Number | Name | Date |
| --- | --- | --- |
| 1,855,948 | Drosin | Apr. 26, 1932 |
| 1,955,484 | Birdseye | Apr. 17, 1934 |
| 2,166,278 | Alderfer | July 18, 1939 |

FOREIGN PATENTS

| Number | Country | Date |
| --- | --- | --- |
| 15,763 | Australia | Jan. 2, 1935 |

OTHER REFERENCES

"The Food Packer," August 1944, page 72, article entitled "Lab introduces pre-cooked frozen fish."